United States Patent
Roth (10) Patent No.: US 11,655,738 B2
(45) Date of Patent: May 23, 2023

(54) GDCI ENGINE WITH ACCELERATED OIL WARM-UP

(71) Applicant: DELPHI TECHNOLOGIES IP LIMITED, St. Michael (BB)

(72) Inventor: Gregory Thomas Roth, Davison, MI (US)

(73) Assignee: DELPHI TECHNOLOGIES IP LIMITED, St. Michael (BB)

(*) Notice: Subject to any disclaimer, the term of this patent is extended or adjusted under 35 U.S.C. 154(b) by 1955 days.

(21) Appl. No.: 14/958,969

(22) Filed: Dec. 4, 2015

(65) Prior Publication Data

US 2017/0159516 A1    Jun. 8, 2017

(51) Int. Cl.
| | |
|---|---|
| F01M 5/00 | (2006.01) |
| F01M 1/16 | (2006.01) |
| F01M 5/02 | (2006.01) |
| F01M 1/08 | (2006.01) |
| F01P 3/08 | (2006.01) |
| F02M 26/01 | (2016.01) |
| F02B 75/12 | (2006.01) |

(52) U.S. Cl.
CPC ............. *F01M 5/007* (2013.01); *F01M 1/08* (2013.01); *F01M 1/16* (2013.01); *F01M 5/001* (2013.01); *F01M 5/002* (2013.01); *F01M 5/021* (2013.01); *F01P 3/08* (2013.01); *F02B 75/12* (2013.01); *F02M 26/01* (2016.02); F01P 2025/40 (2013.01); F01P 2037/02 (2013.01); F01P 2060/04 (2013.01)

(58) Field of Classification Search
CPC ............ F01M 5/007; F01M 1/08; F01M 1/16; F01M 5/001; F01M 5/021; F02M 26/01

USPC .................................................. 123/196 AB
See application file for complete search history.

(56) References Cited

U.S. PATENT DOCUMENTS

| | | | | |
|---|---|---|---|---|
| 8,997,698 | B1* | 4/2015 | Roth .................... | F01P 3/08 123/41.35 |
| 2012/0234286 | A1* | 9/2012 | Quix .................... | F01M 5/00 123/196 AB |
| 2012/0285413 | A1* | 11/2012 | Pingen ................. | F01M 5/02 123/196 AB |
| 2013/0179049 | A1* | 7/2013 | Grieser ................ | F02D 45/00 701/102 |

FOREIGN PATENT DOCUMENTS

| | | |
|---|---|---|
| JP | H01285614 A | 11/1989 |
| JP | 2004293509 A * | 10/2004 |
| JP | 2014101763 A * | 6/2014 |

OTHER PUBLICATIONS

Development of a Gasoline Direct Injection Compression Ignition (GDCI) Engine, Sellnau et al., Apr. 1, 2014.*
Mark Sellnau et al: "Development of a Gasoline Direct Injection Compression Ignition (GDCI) Engine", SAE International Journal of Engines, vol. 7, No. 2, Apr. 1, 2014, pp. 835-851, XP055358885.

* cited by examiner

*Primary Examiner* — Lindsay M Low
*Assistant Examiner* — Omar Morales
(74) *Attorney, Agent, or Firm* — Joshua M. Haines; Bookoff McAndrews, PLLC (57) ABSTRACT

A piston oil squirter is selectively opened when an oil temperature is below a threshold oil temperature to transfer heat from the combustion chamber and heat the oil more rapidly when the engine is cold.

21 Claims, 4 Drawing Sheets

GDCI ENGINE WITH ACCELERATED OIL WARM-UP

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to a lubrication system for an internal combustion engine.

Lubrication systems are used in internal combustion engines to lubricate the engine's internal components with oil and reduce friction, which extends component life and increases engine operating efficiency.

The lubrication system also, in part, manages engine operating temperature. For example, some engine oil systems use oil squirters that direct oil onto an underside of each piston to cool the pistons to avoid excessive piston temperature and resultant combustion problems. In one example arrangement, each oil squirter incorporates a check valve that opens at a threshold oil operating pressure. Since the threshold oil pressure is achieved once the engine has started, the oil squirters spray oil on the pistons regardless of temperature. In other embodiments, the oil pump may be a two-stage pump in which oil pressure is switched between low pressure and high pressure, the latter of which enables the piston squirters.

A Gasoline Direct-injection Compression-Ignition (GDCI) engine has been proposed in which oil squirters are used to selectively cool individual pistons, as disclosed in U.S. Pat. No. 8,997,698. Instead of check valves, electrically controlled valves are commanded to an open position with an on-off control signal or a Pulse Width Modulated (PWM) control signal to cool individual pistons as needed once a threshold temperature of the associated combustion chamber has been exceeded, thereby avoiding combustion control problems.

SUMMARY

In one exemplary embodiment, an internal combustion engine includes a piston and an oil squirter associated with the piston. A valve is associated with the oil squirter. The valve is configured to selectively open in response to a command and direct oil at the piston. A controller is in communication with the valve. The controller is configured to provide the command in response to an oil temperature falling below a threshold oil temperature.

In a further embodiment of the above, the engine includes multiple pistons that include the piston, multiple oil squirters that include the oil squirter and multiple valves that include the valve. The controller is in communication with the valves and is configured to provide the command to each valve in response to the oil temperature falling below a threshold oil temperature for its respective piston.

In a further embodiment of any of the above, the engine includes an oil cooler in fluid communication with the oil squirter and the valve. A cooling system is in fluid communication with the oil cooler. The cooling system includes at least one of a valve and a pump. The controller is in communication with the at least one of a valve and a pump. The controller is configured to regulate a flow of coolant through the oil cooler in response to the oil temperature falling below the threshold oil temperature compared to the flow of coolant with the oil temperature above the threshold temperature.

In a further embodiment of any of the above, the engine includes a cylinder that receives the piston and provides a combustion chamber. The controller is configured to receive an engine control parameter indicative of in-cylinder combustion conditions. The controller is configured to compare the in-cylinder combustion conditions to desired in-cylinder combustion conditions sufficient for combustion. The controller is configured to provide the command only if the in-cylinder combustion conditions are at least as favorable as the desired in-cylinder combustion conditions.

In a further embodiment of any of the above, the in-cylinder combustion conditions are based upon an engine control parameter that includes at least one of an intake air state, a cylinder temperature state, and an exhaust state. The controller is configured to control the engine control parameter to provide heat in excess of that needed for the desired in-cylinder combustion conditions. The excess heat is configured to be transferred to the oil in response to the command.

In a further embodiment of any of the above, the engine includes at least one of a supercharger, a turbocharger and an intake manifold heater. The controller is in communication with the at least one of a supercharger, a turbocharger and an intake manifold heater. The controller is configured to control the at least one of a supercharger, a turbocharger and an intake manifold heater to provide the excess heat.

In a further embodiment of any of the above, the engine includes at least one of a engine coolant pump and a coolant control valve. The controller is in communication with the at least one of an engine coolant pump and a coolant control valve. The controller is configured to control the at least one of a coolant pump and a coolant control valve to provide the excess heat.

In a further embodiment of any of the above, the engine includes at least one of a variable intake valvetrain and a variable exhaust valvetrain to facilitate rebreathing of hot exhaust gasses back into the combustion chamber. The controller is in communication with the at least one of a variable intake valvetrain and a variable exhaust valvetrain. The controller is configured to control at least one of a variable intake valvetrain and a variable exhaust valvetrain to control the amount of exhaust gas that is rebreathed back into the combustion chamber to provide the excess heat.

In a further embodiment of any of the above, the in-cylinder combustion conditions are based upon an engine control parameter that includes at least one of engine a combustion phasing angle, a location of peak combustion pressure, a combustion efficiency, a polytropic compression exponent, or a peak compression charge air temperature.

In a further embodiment of any of the above, the engine is a Gasoline Direct-injection Compression-Ignition engine that includes an injection system that is configured to provide distributed equivalence ratio air/fuel mixture to a combustion chamber essentially throughout an entire engine operating load and speed range. The air/fuel mixture includes a distribution of discrete equivalence ratios.

In another exemplary embodiment, a method of operating an engine lubrication system includes selectively opening an oil squirter in response to an oil temperature falling below a threshold oil temperature.

In a further embodiment of any of the above, the method includes the step of reducing a flow of coolant through an oil cooler in response to the oil temperature falling below the threshold oil temperature compared to the flow of coolant with the oil temperature above the threshold temperature.

In a further embodiment of any of the above, the method includes the steps of detecting an engine control parameter indicative of in-cylinder combustion conditions, comparing the in-cylinder combustion conditions to desired in-cylinder combustion conditions sufficient for combustion, and performing the selectively opening step only if the in-cylinder combustion conditions are at least as favorable as the desired in-cylinder combustion conditions.

In a further embodiment of any of the above, the engine control parameter is measured.

In a further embodiment of any of the above, the in-cylinder combustion conditions are based upon an engine control parameter that includes at least one of an engine combustion phasing angle, a location of peak combustion pressure, a combustion efficiency, a polytropic compression exponent, or a peak compression charge air temperature.

In a further embodiment of any of the above, the engine control parameter is estimated.

In a further embodiment of any of the above, the in-cylinder change air conditions are based upon an engine control parameter that includes at least one of an intake air state, a cylinder temperature state, and an exhaust state. It comprising the steps of controlling the engine control parameter to provide heat in excess of that needed for the desired in-cylinder combustion conditions, and transferring the excess heat to the oil in response to the selective opening step.

In a further embodiment of any of the above, the method includes the step of selectively opening multiple valves independently from one another in response to in-cylinder combustion conditions associated with a combustion chamber of the respective valve.

In a further embodiment of any of the above, the method includes the step of spraying oil onto an underside of a piston in response to the selectively opening step.

In a further embodiment of any of the above, the threshold oil temperature is less than the desired coolant operating temperature.

In a further embodiment of any of the above, the oil temperature is measured.

In a further embodiment of any of the above, the oil temperature is estimated.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
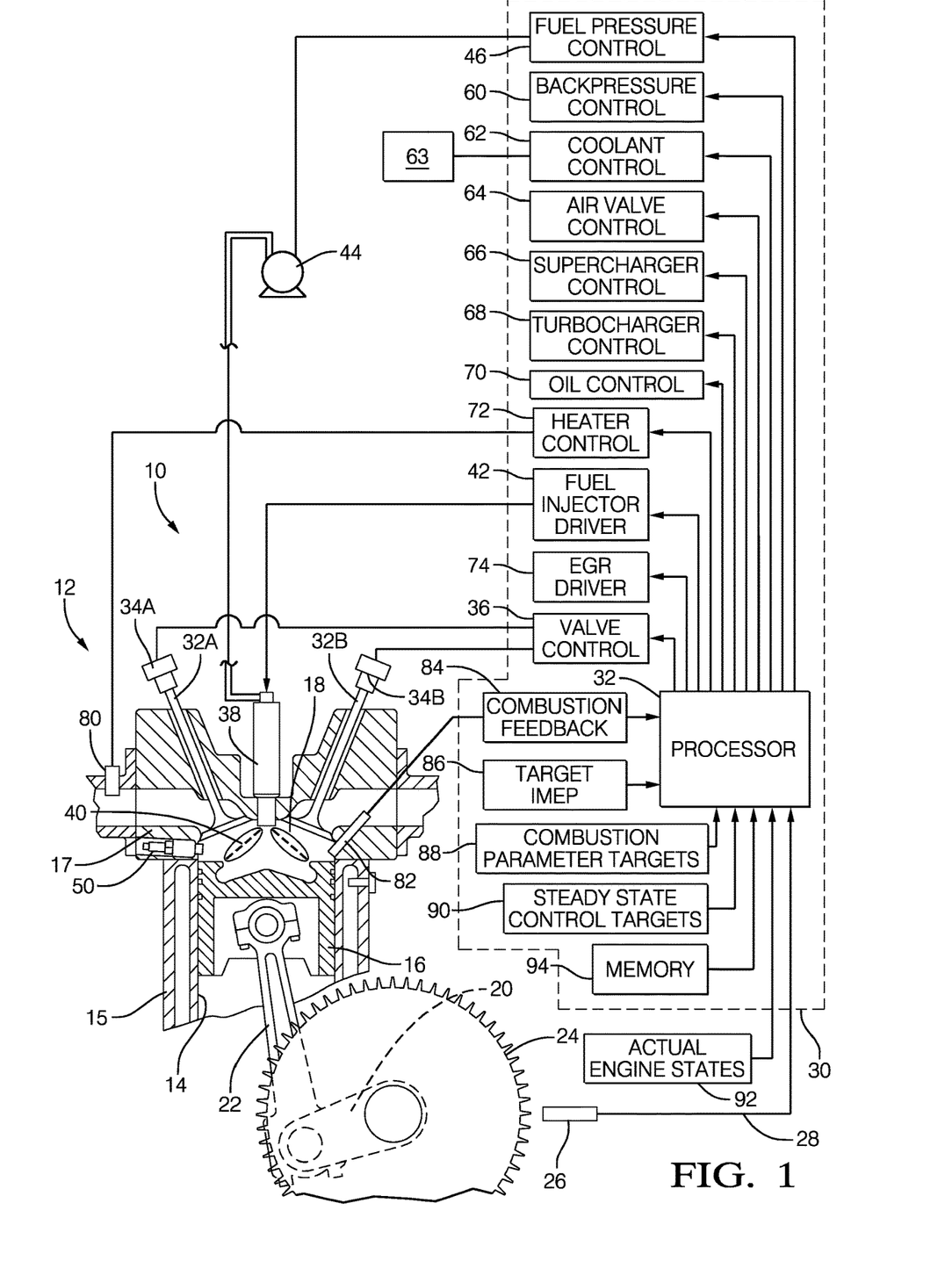
FIG. 1 is a schematic view of an embodiment of an engine control system suitable for controlling a GDCI engine.

FIG. 1 illustrates a non-limiting embodiment of an engine control system 10 suitable for controlling a GDCI (Gasoline Direct-injection Compression-Ignition) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, entitled "High-Efficiency Internal Combustion Engine and Method for Operating Employing Full-Time Low-Temperature Partially-Premixed Compression Ignition with Low Emissions," filed Oct. 26, 2011, which is incorporated herein by reference in its entirety. This distributed-equivalence ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for spark ignition engines and compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a providing an engine block 15 with a cylinder bore 14 containing a piston 16, wherein the region above the piston 16 defines a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle θ, which corresponds to the linear position of the piston 16, and a crank speed N.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are provided in a cylinder head 17 and driven by one or more camshafts to regulate the flow of air into and exhaust from the combustion chamber 18. In one embodiment, a cam phaser 34A, 34B is respectively coupled to each of the intake valve 32A and the exhaust valve 32B, to provide further control of lift and/or duration of the valves beyond that provided by the camshaft profile. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially pre-mixed-mixture, low-temperature combustion process is used. Fuel 40 is injected by the fuel injector 38, where the fuel injector is fed by a fuel rail at a pressure in the range of, for example, 100 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed N and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
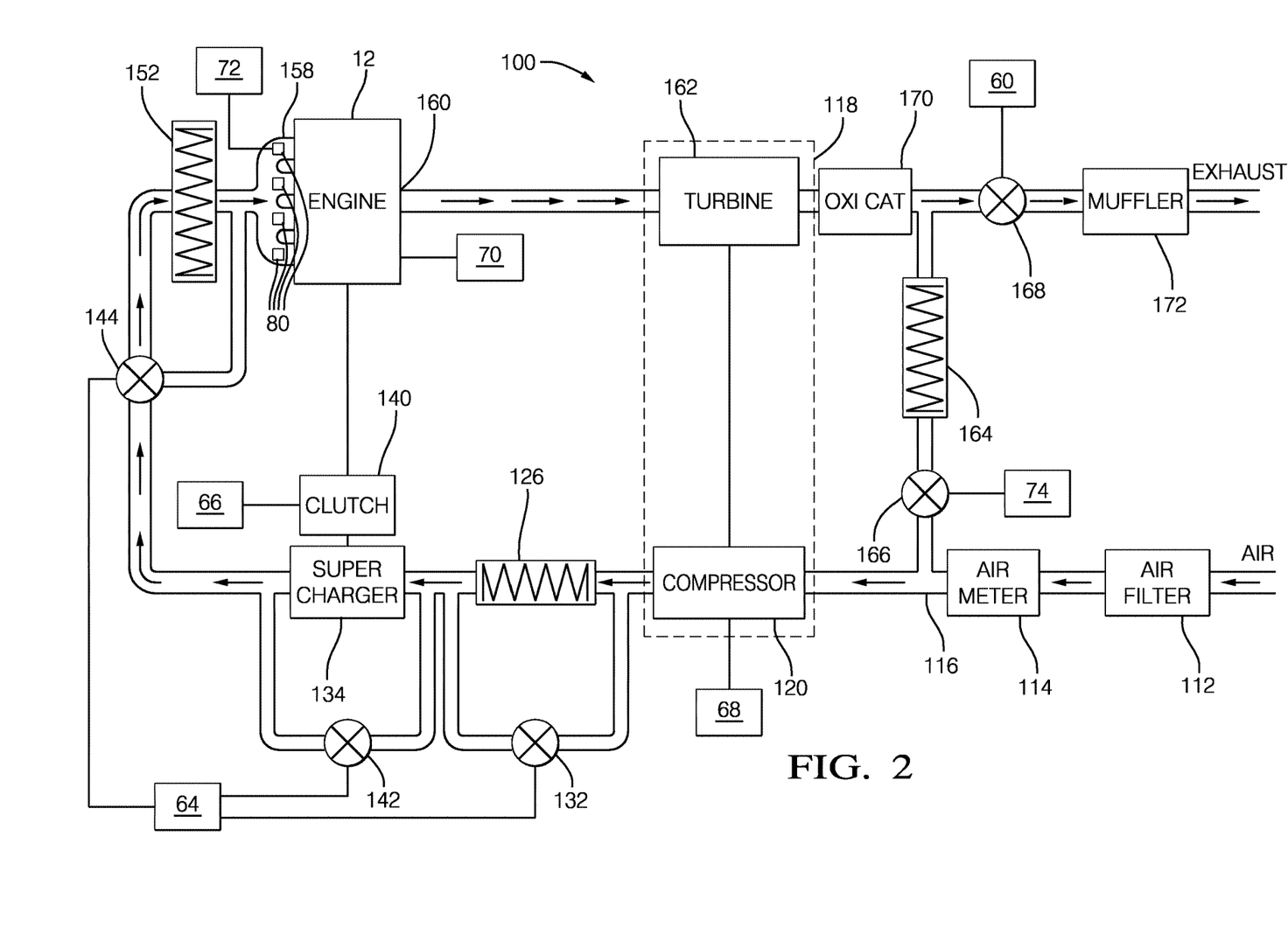
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a supercharger 134. A first charge air cooler bypass valve 132 is connected between an air inlet and an air outlet of the first charge air cooler 126 to selectively divert air around the first charge air cooler 126.

Air from first charge air cooler 126 is channeled to the air inlet 136 of a supercharger 134, which is driven by the engine 12 through a controllable clutch 140 in communication with a supercharger control 66 (FIG. 1). A controllable supercharger bypass valve 142 allows air to bypass the supercharger 134. The air from the supercharger 134 and/or from the supercharger bypass valve 142 is channeled to a second charge air cooler bypass valve 144. The second charge air cooler bypass valve 144 selectively provides air to a second charge air cooler 152 and/or an air intake manifold 158 of the engine 12. An air valve control 64 (FIG. 1) is in communication with the first charge air cooler bypass valve 132, supercharger bypass valve 142 and second charge air cooler bypass valve 144 to coordinate the flow of air therethrough.

An air intake heater 80 is arranged in each of an intake runner of the air intake manifold 158. Each air intake heater 80 is in communication with a heater control 72 (FIG. 1) and is configured to heat air at the intake port of a corresponding cylinder 14 of the engine 12. Alternatively, a single heat source may be disposed in the air intake manifold 158 so as to heat air supplied to all of the intake ports of the engine 12.

With continuing reference to FIG. 2, following a combustion event, exhaust gas exits one or more exhaust ports 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 166 that is controlled by an EGR driver 74 (FIG. 1), to be reintroduced into the intake air stream at air duct 116. Another portion of the exhaust gas may be rebreathed from the exhaust ports 160 back into the combustion chamber 18 through the exhaust valve 32B to raise the temperature of the air charge in the combustion chamber for the subsequent combustion cycle. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

Figure 3:
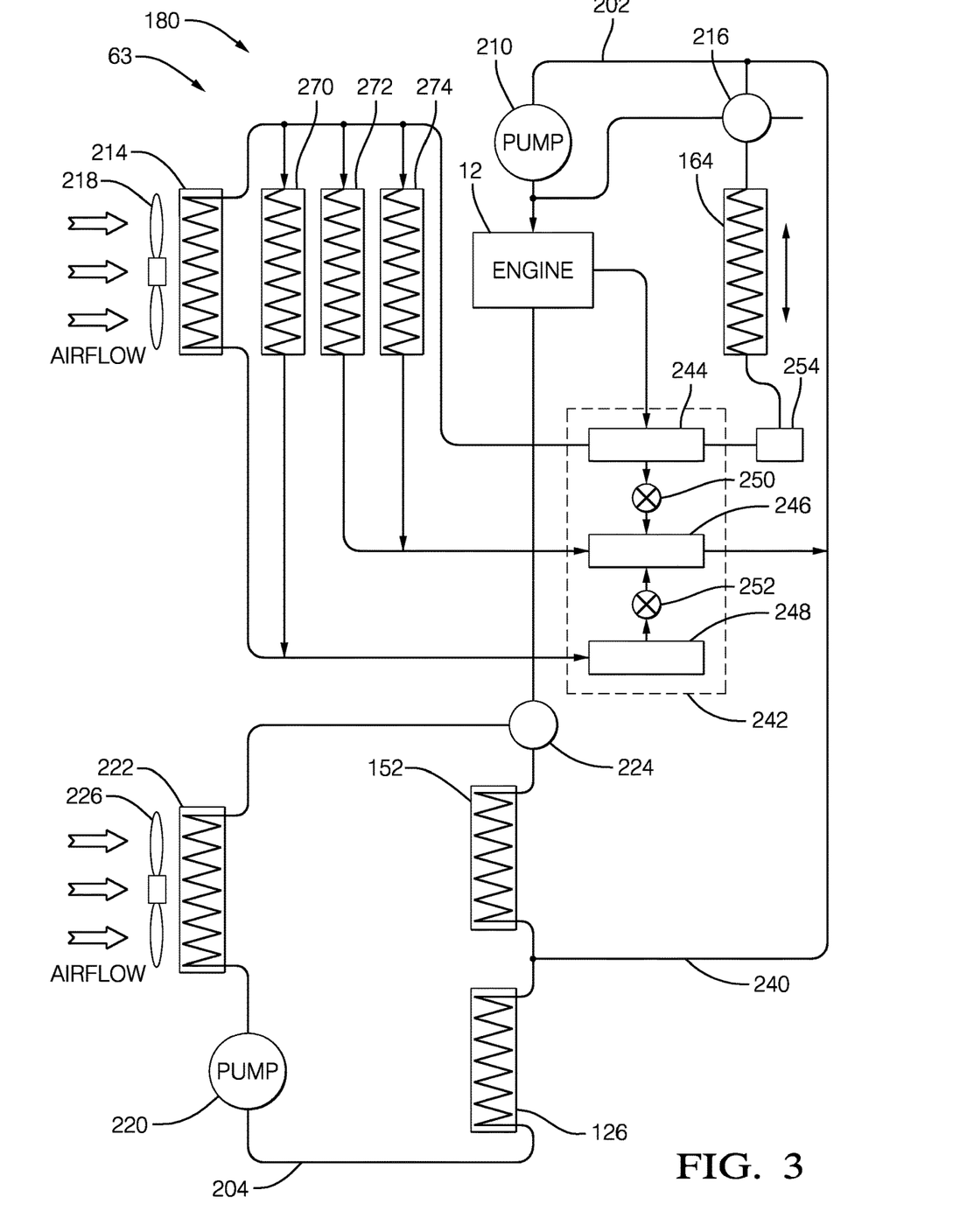
FIG. 3 is a schematic view of a coolant system for the engine shown in FIG. 1.

FIG. 3 depicts the coolant system 63 and its coolant paths 180 in more detail. The engine 12, the first charge air cooler 126, the second charge air cooler 152, and the EGR cooler 164 are arranged in the coolant paths. The coolant system 180 may further include an oil cooler 270, a heat exchanger 272 to provide cooling for the turbocharger 118 and a heater core 274 (used to heat the vehicle cabin), a temperature sensing device, a pressure sensing device, and/or other components not shown in FIG. 2.

The coolant system 63 includes a first coolant loop 202, for example, a "high temperature" loop. The first coolant loop 202 includes a first coolant pump 210 configured to circulate liquid coolant through coolant passages in the engine 12 and through a first radiator 214. In one example, the first coolant pump 210 is a mechanical pump rotationally driven by the engine 12. The first radiator 214 is a conventional automotive radiator, for example, with a controllable fan 218 configured to pass air over the first radiator 214. In one example, the fan 218 is a variable speed fan, but the fan instead may be a single speed fan, a two speed fan, a fan of any sort in conjunction with one or more controllable shutters, or the like, if desired.

The coolant paths 180 include a thermostat crossover assembly 242 within which is defined a first chamber 244, a second chamber 246, and a third chamber 248. A first thermostat 250 allows fluid communication between the first chamber 244 and the second chamber 246 when the temperature of the coolant at the first thermostat 250 is within a first predetermined range. A second thermostat 252 allows fluid communication between the third chamber 248 and the second chamber 246 when the temperature of the coolant at the second thermostat 252 is within a second predetermined range. It will be appreciated that, while the first chamber 244, the second chamber 246, the third chamber 248, the first thermostat 250, and the second thermostat 252 are depicted as housed in a common enclosure, these components may be otherwise distributed within the coolant system 63. Thermostats 250 and 252 may alternatively be controlled by the controller 30 such that their opening and closing temperatures and opening amounts may be varied by the controller to retain additional heat in the engine block 15 and cylinder head 17.

The coolant system 63 also includes the EGR cooler 164, one coolant port of which is connected to a four-way coolant valve 216. The other coolant port of EGR cooler 164 is fluidly coupled to the first chamber 244 through an orifice 254.

A second coolant loop 204, a "low temperature" loop, is also provided in the coolant system 63. The second coolant loop 204 includes a second coolant pump 220 configured to circulate liquid coolant through a second radiator 222, the second charge air cooler 152, a three-way coolant valve 224, and the first charge air cooler 126. The second radiator 222 is a conventional automotive radiator in one example with a controllable fan 226 configured to pass air over the second radiator 222. In one example, the second fan 226 is a variable speed fan, but the second fan 226 can instead be provided by, a single speed fan, a two speed fan, a fan of any sort in conjunction with one or more controllable shutters, or the like, if desired. Alternately, the second radiator 222 may be positioned in line with the first radiator 214 such that the first fan 218 passes air over both the second radiator 222 and the first radiator 214.

Coolant communication between the first coolant loop 202 and the second coolant loop 204 is enabled by the three-way coolant valve 224 and a conduit 240. Control of the four-way coolant valve 216 and the three-way coolant valve 224 may be employed to achieve desired temperature conditioning of intake air. Operation of a similar system is disclosed in United States Publication No. 2013/0298554 entitled "System and method for conditioning intake air to an internal combustion engine" filed May 11, 2012, which is incorporated herein by reference in its entirety.

Figure 4:
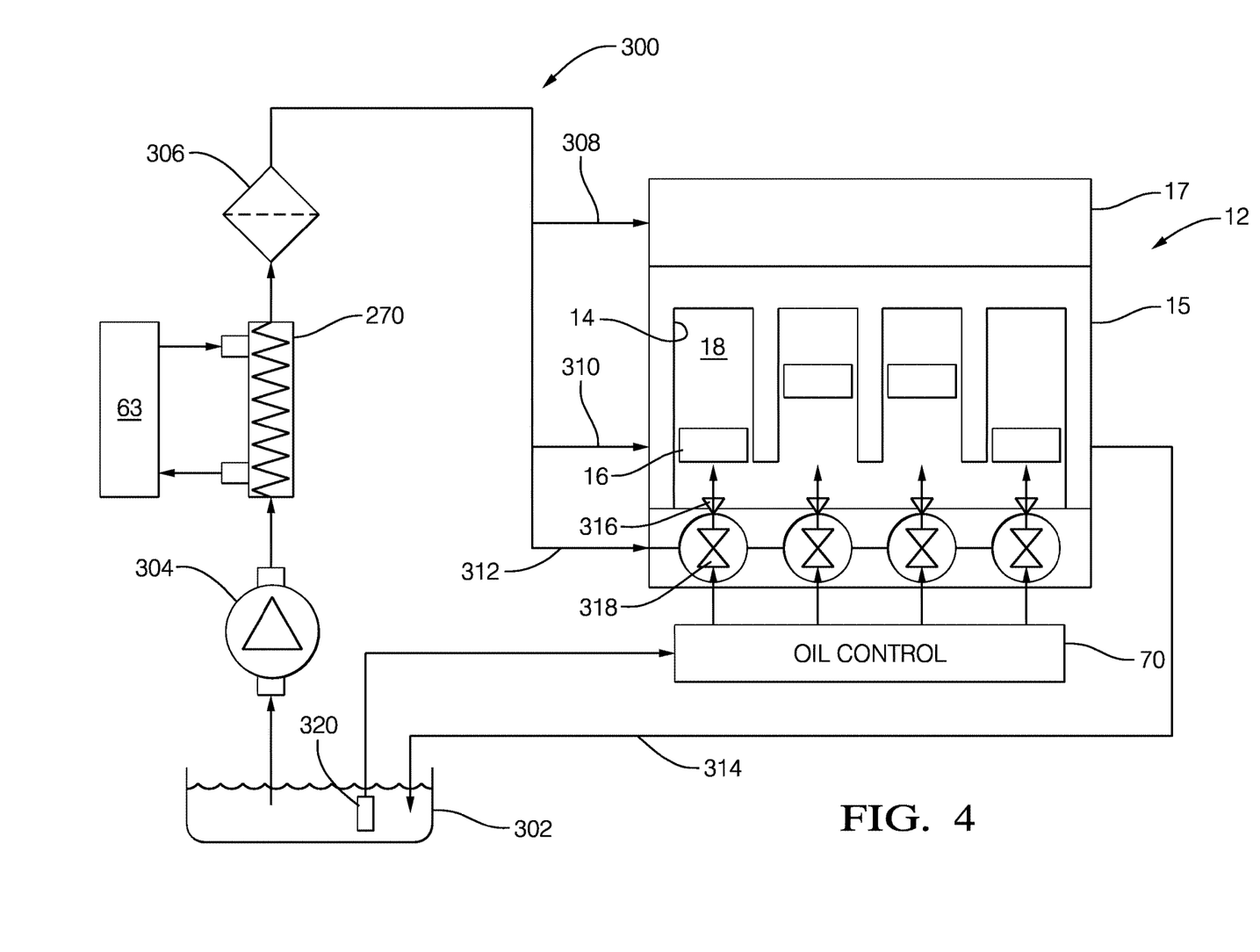
FIG. 4 is a schematic view of a lubrication system for the engine shown in FIG. 1.

Referring to FIG. 4, a lubrication system 300 is shown that provides a lubricating fluid, such as oil, to the engine 12. Oil is drawn from a sump 302, which can be wet or dry, by an oil pump 304 to supply oil through supply passages to lubricate various moving components of the engine 12. The oil pump 304 is driven by a mechanical coupling to the engine 12 in one example, but it should be understood that the oil pump 304 may also be electrically driven to provide more refined control of the oil operating pressure and flow, if desired.

Oil passes from the oil pump 304 through the oil cooler 270 to a filter 306 before reaching the engine 12. A first oil supply passage 308 provides oil to the cylinder head 17 to lubricate, for example, the valves 32A, 32B and a camshaft. A second oil supply passage 310 supplies oil to the engine block 17 wherein bearings associated with the crankshaft 20 and the connecting rods 22 are lubricated. Oil may be splashed or sprayed onto the sliding interface between the pistons 16 and cylinders 18 for lubrication. A third oil supply passage 312 provides oil to piston squirters 316 through valves 318. The piston squirters 316 direct oil onto or near the underside of the pistons 16 to remove heat from the combustion chambers 18 via the pistons 16. It should be understood that the first, second and third oil supply passages 308, 310, 312 need not be discrete passages and that more or fewer passages may be used. The piston squirters 316 are normally used to extract excessive heat from the combustion chamber under high load conditions to reduce the temperature of the combustion chamber.

In the preceding discussion relative to FIGS. 1-4, it will be appreciated that the engine control system 10, the gas path system 100, the coolant system 63 and the lubrication system 300 can influence the temperature and pressure within the combustion chamber 18. GDCI is a low-temperature combustion process with high thermal efficiency (ratio of useful work extracted over fuel energy). Low heat loss is an intentional design objective of the combustion process. Low heat loss therefore results in a slow temperature rise in the engine components, oil, and coolant.

Engine friction in bearing surfaces is higher with low temperature (high viscosity) oil, which leads to increased fuel consumption to overcome the friction. The disclosed engine 12 directs waste heat that is currently being rejected to the atmosphere via the high temp and low temp radiators into the oil instead to bring the oil to a targeted operating temperature faster, thereby reducing friction and fuel consumption. To this end, the valves 318 are selectively opened in response to a command, for example, an electrical signal from the controller 30 via oil control 70 in response to an oil temperature being or falling below a threshold oil temperature. An increase in oil pressure can also be commanded by the controller 30 to open the valves 318 in response to an oil temperature being or falling below a threshold oil temperature. The oil temperature can be measured by a temperature sensor 320 or estimated by reference to other engine operating parameters from which the oil temperature can be inferred. For example, enabling the oil-warming mode could be triggered by the coolant temperature, the intake air temperature, exhaust temperature or combination thereof. In one example, the oil threshold temperature is less than the targeted engine coolant operating temperature, which may be 80° C. to 100° C. Alternatively, the coolant control valve could be mechanically controlled (thermostat) to control the flow of coolant through the oil cooler in response to coolant temperature falling below a threshold.

The piston oil squirters 316 provide a method to heat the engine oil during cold starts. The oil squirter 316 is selectively opened when an oil temperature is below a threshold oil temperature to transfer heat from the combustion chamber 18 and heat the oil more rapidly when the engine is cold. In the example embodiment, each piston/cylinder of a multi-cylinder engine includes an associated piston squirter 316 and valve 318 to control the transfer of heat from each piston 16 independently from one another.

During GDCI cold starts, typically a main focus of the control system is to warm the intake air and coolant to levels that provide robust combustion control and the ability to handle transient load and speed events while maintain desired in-cylinder charge air conditions. The thermal management system is typically configured to retain heat in the intake air and coolant to promote and control autoignition.

In the disclosed system, instead of immediately rejecting heat to the coolant system 63 via low temperature loop 204 and/or high temperature loop 202 once initial in-cylinder charge air and combustion conditions have been achieved, excess heat can be preferentially directed into the oil, thereby lowering its viscosity and reducing friction during warm-up accordingly. It would not be desirable to remove heat from the combustion chamber 18 through the piston 16 if the desired in-cylinder charge air conditions and combustion conditions have not yet been reached. To this end, the controller 30 is configured to compare the in-cylinder charge air and combustion conditions to desired in-cylinder charge air and combustion conditions sufficient for robust combustion. The controller 30 is configured to provide the command to open the valve 318 only if the in-cylinder charge air and combustion conditions are at least as favorable as the desired conditions.

In-cylinder charge air conditions are based upon an engine control parameter that includes at least one of an intake air state, a cylinder temperature state, an exhaust state, an intake valve state and an exhaust valve state. Exhaust state is affected by exhaust valve timing and the turbocharger operating condition, for example. The intake air state is affected by ambient air temperature, supercharger and turbocharger operating conditions, air intake heaters, charge air coolers and other components arranged within and conditions in the air intake path. The cylinder temperature state is affected by piston temperature, head temperature, cylinder wall temperature, coolant flow rate and temperature, and the combustion cycle history. The in-cylinder combustion conditions are based upon an engine control parameter that includes at least one of engine a combustion phasing angle, a location of peak combustion pressure, combustion efficiency, a polytropic compression exponent, or a peak compression charge air temperature. The combustion phasing angle is defined, for example, as the crank angle at which 50% of the heat release of the fuel has occurred. The location of peak pressure is defined as the crank angle at which combustion chamber pressure reaches its maximum value. Combustion efficiency is defined as the fraction of heat release achieved for that cycle compared to the maximum heat release available for the injected fuel mass. The polytropic compression exponent, k, defines the relationship between combustion chamber pressure and combustion chamber volume during the compression stroke, and is mathematically $PV^k$=constant. The peak compression charge air temperature is defined as the maximum temperature of the charge air during the compression process in the absence of combustion. Combustion phasing, location of peak pressure, combustion efficiency, and polytropic compression exponent are determined by analysis of the cylinder pressure during the compression and expansion stroke of the engine cycle. Peak compression charge air temperature is estimated based on intake air state, cylinder temperature state, exhaust state, intake valve state and exhaust valve state.

The controller 30 may also be configured to control the engine control parameter to provide heat in excess of that needed for the desired in-cylinder combustion conditions, if doing so is not detrimental to in-cylinder conditions, so that the excess heat can be transferred to the oil. Since the target charge air temperature can be obtained with various combinations of intake air state, cylinder temperature state, and exhaust state, the target state for each input can be varied in a manner that generates the desired final charge air state. In one example, the controller 30 permits the intake air temperature to exceed 55° C. Allowing intake air temperature to rise above one typical target promotes combustion and enables the oil squirter to remove heat from combustion chamber and warm the oil while maintaining the desired in-cylinder charge air state.

Utilizing excess heat from one or more of these input parameters can allow for heat transfer to the oil without compromising performance. Before excess energy is rejected to the oil cooler 270 or other components of the cooling system 63, the oil squirter is turned on and heat is transferred from the combustion chamber 18 through the piston 16 and into the oil.

Additionally, the controller 30 can control one or more valves and pumps in the coolant system 63 to reduce or stop the coolant flow through the coolant system 63, which reduces the heat transfer from the oil to the coolant in the oil cooler 270 and/or other heat exchangers so that the oil is heated more rapidly.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An internal combustion engine comprising:
   a piston;
   an oil squirter associated with the piston;
   a valve associated with the oil squirter, the valve is configured to selectively open in response to a command and direct oil at the piston;
   a controller in communication with the valve, the controller configured to provide the command in response to an oil temperature falling below a threshold oil temperature; and
   an oil cooler in fluid communication with the oil squirter and the valve, and a cooling system in fluid communication with the oil cooler, the cooling system includes at least one of a valve and a pump, the controller in communication with the at least one of a valve and a pump, the controller configured to regulate a flow of coolant through the oil cooler in response to the oil temperature falling below the threshold oil temperature compared to the flow of coolant with the oil temperature above the threshold temperature.

2. The engine according to claim 1, comprising multiple pistons that include the piston, multiple oil squirters that include the oil squirter, multiple valves that include the valve, the controller is in communication with the valves and is configured to provide the command to each valve in response to the oil temperature falling below a threshold oil temperature for its respective piston.

3. The engine according to claim 1, wherein the engine is a Gasoline Direct-injection Compression-Ignition engine that includes an injection system configured to provide distributed equivalence ratio fuel to a combustion chamber essentially throughout an entire engine operating load and speed range, wherein the air/fuel mixture includes a distribution of discrete equivalence ratios.

4. The engine according to claim 1, wherein the valve is configured to selectively close which prevents oil from being directed at the piston through the oil squirter.

5. The engine according to claim 1, further comprising a cylinder that receives the piston and provides a combustion chamber, and the controller is configured to receive an engine control parameter indicative of in-cylinder combustion conditions, the controller is configured to compare the in-cylinder combustion conditions to desired in-cylinder combustion conditions sufficient for combustion, and the controller is configured to provide the command only if the in-cylinder combustion conditions are at least as favorable as the desired in-cylinder combustion conditions.

6. An internal combustion engine comprising:
   a piston;
   an oil squirter associated with the piston;
   a valve associated with the oil squirter, the valve is configured to selectively open in response to a command and direct oil at the piston;
   a controller in communication with the valve, the controller configured to provide the command in response to an oil temperature falling below a threshold oil temperature; and
   a cylinder that receives the piston and provides a combustion chamber, and the controller is configured to receive an engine control parameter indicative of in-cylinder combustion conditions, the controller is configured to compare the in-cylinder combustion conditions to desired in-cylinder combustion conditions sufficient for combustion, and the controller is configured to provide the command only if the in-cylinder combustion conditions are at least as favorable as the desired in-cylinder combustion conditions.

7. The engine according to claim 6, wherein the in-cylinder combustion conditions are based upon an engine control parameter that includes at least one of an intake air state, a cylinder temperature state, and an exhaust state, wherein the controller is configured to control the engine control parameter to provide heat in excess of that needed for the desired in-cylinder combustion conditions, the excess heat configured to be transferred to an oil in response to the command.

8. The engine according to claim 7, comprising at least one of a supercharger, a turbocharger and an intake manifold heater, the controller in communication with the at least one of a supercharger, a turbocharger and an intake manifold heater, wherein the controller is configured to control the at least one of a supercharger, a turbocharger and an intake manifold heater to provide the excess heat.

9. The engine according to claim 7, comprising at least one of an engine coolant pump and a coolant control valve, the controller is in communication with the at least one of an engine coolant pump and a coolant control valve, the controller is configured to control the at least one of a coolant pump and a coolant control valve to provide the excess heat.

10. The engine according to claim 7, comprising at least one of a variable intake valvetrain and a variable exhaust valvetrain to facilitate rebreathing of hot exhaust gasses back into the combustion chamber, the controller is in communication with the at least one of a variable intake valvetrain and a variable exhaust valvetrain, the controller is configured to control the at least one of a variable intake valvetrain and a variable exhaust valvetrain to control the amount of exhaust gas that is rebreathed back into the combustion chamber to provide the excess heat.

11. The engine according to claim 7, wherein the in-cylinder combustion conditions are based upon an engine control parameter that includes at least one of engine a combustion phasing angle, a location of peak combustion pressure, a combustion efficiency, a polytropic compression exponent, or a peak compression charge air temperature.

12. A method of operating an engine lubrication system comprising:
    selectively opening an oil squirter in response to an oil temperature falling below a threshold oil temperature; and
    reducing a flow of coolant through an oil cooler in response to the oil temperature falling below the threshold oil temperature compared to the flow of coolant with the oil temperature above the threshold temperature.

13. The method according to claim 12, comprising the steps of detecting an engine control parameter indicative of in-cylinder combustion conditions, comparing the in-cylinder combustion conditions to desired in-cylinder combustion conditions sufficient for combustion, and performing the selectively opening step only if the in-cylinder combustion conditions are at least as favorable as the desired in-cylinder combustion conditions.

14. The method according to claim 13, wherein the engine control parameter is measured.

15. The method according to claim 13, wherein the in-cylinder combustion conditions are based upon an engine control parameter that includes at least one of an engine combustion phasing angle, a location of peak combustion pressure, a combustion efficiency, a polytropic compression exponent, or a peak compression charge air temperature.

16. The method according to claim 13, wherein the engine control parameter is estimated.

17. The method according to claim 13, wherein the in-cylinder charge air conditions are based upon an engine control parameter that includes at least one of an intake air state, a cylinder temperature state, and an exhaust state, and comprising the steps of controlling the engine control parameter to provide heat in excess of that needed for the desired in-cylinder combustion conditions, and transferring the excess heat to the oil in response to the selective opening step.

18. The method according to claim 12, comprising the step of selectively opening multiple valves independently from one another in response to in-cylinder combustion conditions associated with a combustion chamber of the respective valve.

19. The method according to claim 12, comprising the step of spraying oil onto an underside of a piston in response to the selectively opening step.

20. The method according to claim 12, wherein the threshold oil temperature is less than the desired coolant operating temperature.

21. The method according to claim 20, wherein the oil temperature is measured.

* * * * *